United States Patent
Thyni

(10) Patent No.: US 9,054,966 B2
(45) Date of Patent: *Jun. 9, 2015

(54) METHOD AND ARRANGEMENT FOR NETWORK QOS

(71) Applicant: TELEFONAKTIEBOLAGET L M ERICSSON (PUBL), Stockholm (SE)

(72) Inventor: Tomas Thyni, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,044

(22) Filed: Nov. 26, 2013

(65) Prior Publication Data

US 2014/0082162 A1    Mar. 20, 2014

Related U.S. Application Data

(63) Continuation of application No. 12/808,296, filed as application No. PCT/SE2007/051012 on Dec. 17, 2007, now Pat. No. 8,650,294.

(51) Int. Cl.
G06F 15/16 (2006.01)
G06Q 50/18 (2012.01)
H04L 12/24 (2006.01)

(52) U.S. Cl.
CPC .......... *H04L 41/0823* (2013.01); *G06Q 50/188* (2013.01); *H04L 41/5054* (2013.01)

(58) Field of Classification Search
CPC ............ H04L 41/5054; H04L 41/5003; H04L 41/0803; H04L 41/0813; H04L 41/0816; H04L 65/80; H04L 43/12; H04L 47/20; H04L 47/805; H04L 67/322

USPC ......... 709/223, 228, 218, 224, 226, 232, 246, 709/250; 370/466

See application file for complete search history.

(56) References Cited

U.S. PATENT DOCUMENTS 6,502,131 B1    12/2002    Vaid et al.
6,581,102 B1 *   6/2003    Amini et al. ................ 709/231

(Continued)

FOREIGN PATENT DOCUMENTS

EP    1 684 473 A1    7/2006
GB    2 349 715 A     11/2000

(Continued)

OTHER PUBLICATIONS

Ericsson. Impacts of Mechanisms for Operator Controlled QoS in a GPRS IP-Can (Release 7). 3GPP TS SA WG2 vol. SA2#51. S2-060676. Feb. 13, 2006.

(Continued)

*Primary Examiner* — Alina N Boutah

(57) ABSTRACT

A method and intermediate node for service specific configuration of Quality of Service (QoS), preferably end-to-end QoS, in a data network by establishing and enforcing a service specific QoS configuration for a given service supported by a client device. The client device is adapted to be connected to a data network including a service management server and the intermediate node. The intermediate node receives from the service management server, a message including a service configuration for the given service. The service configuration includes information regarding the service specific QoS configuration.

10 Claims, 6 Drawing Sheets

(56) References Cited

U.S. PATENT DOCUMENTS

| | | |
|---|---|---|
| 6,876,667 B1 | 4/2005 | Synnestvedt et al. |
| 2002/0046284 A1 | 4/2002 | Brabson et al. |
| 2002/0065907 A1 | 5/2002 | Cloonan et al. |
| 2003/0135596 A1 | 7/2003 | Moyer et al. |
| 2004/0028052 A1* | 2/2004 | Chen et al. ............... 370/395.2 |
| 2004/0109414 A1 | 6/2004 | Choi et al. |
| 2006/0038877 A1 | 2/2006 | Richardson et al. |
| 2006/0146703 A1* | 7/2006 | Cha et al. ................... 370/229 |
| 2006/0171319 A1* | 8/2006 | Blasco Claret et al. ...... 370/235 |
| 2006/0294584 A1 | 12/2006 | Sundaram |
| 2007/0097861 A1 | 5/2007 | Wilde et al. |
| 2007/0101018 A1* | 5/2007 | Shirazipour et al. .......... 709/238 |
| 2007/0168466 A1 | 7/2007 | Tooley et al. |
| 2007/0223437 A1* | 9/2007 | Virgile .......................... 370/338 |
| 2007/0280251 A1* | 12/2007 | Wang et al. ................ 370/395.1 |
| 2008/0247379 A1* | 10/2008 | Belanger et al. .............. 370/351 |
| 2009/0125631 A1* | 5/2009 | Blom et al. ................... 709/228 |

FOREIGN PATENT DOCUMENTS

| | | |
|---|---|---|
| WO | WO 2007/064253 A1 | 6/2006 |
| WO | WO 2006/100125 A1 | 9/2006 |
| WO | WO 2007/125430 A2 | 11/2007 |

OTHER PUBLICATIONS

Bernet, Y. The Complementary Roles of RSVP and Differentiated Services in the Full-Service QoS Network. IEEE Communications Magazine. Feb. 2000.

* cited by examiner

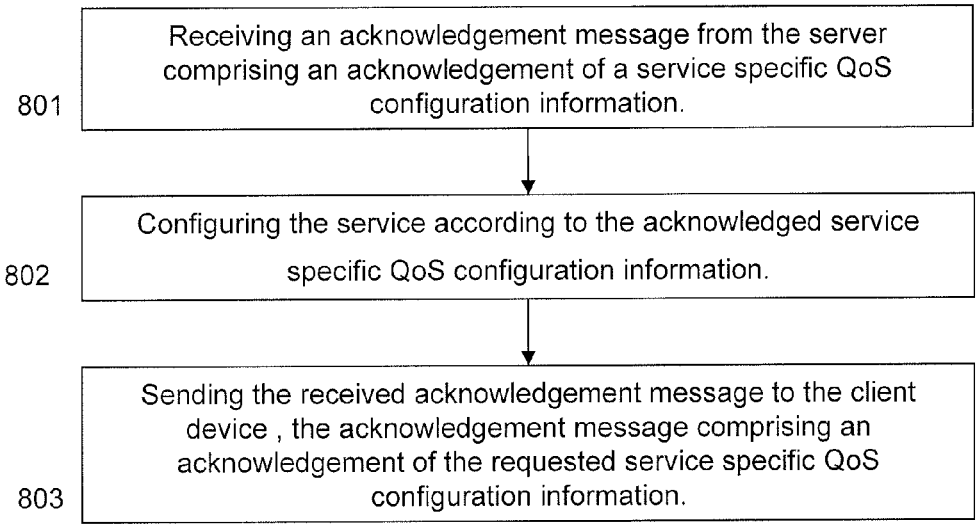
Fig. 8
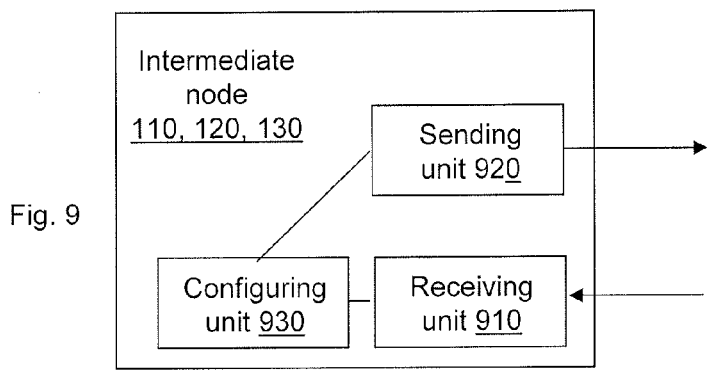
Fig. 9
| Dest. 1 | ER address interv. 1 | QoS dest1 | Dest. 2 | ER address interv. 2 | QoS dest2 | Dest.3 |
Fig. 10

METHOD AND ARRANGEMENT FOR NETWORK QOS

RELATED APPLICATIONS

This application is a continuation of co-pending U.S. patent application Ser. No. 12/808,296 filed Jun. 15, 2010, which is a 371 of International Application No. PCT/SE2007/051012, filed Dec. 17, 2007, the disclosures of which are fully incorporated herein by reference.

TECHNICAL FIELD

The present invention relates to methods and arrangements in a data network. More specifically it relates to methods for quality of service configuration in a data network.

BACKGROUND

Computer networks of today offer a wide range of services delivered by several service providers. The service provider offers data communication means to clients in the service provider's own network as well as access to the Internet via their own network. The product that the service provider sells is bandwidth internally within the own network and bandwidth out to the Internet. There is a major interest in Internet and data communications today leading to higher demands for bandwidth within the service provider's network as well as out to the Internet. This leads to a demand from the service providers of the computer networks for methods and equipments that make it possible to offer tailored services to their clients, thus enabling optimized utilization of the network. Further the service providers want the methods and equipments to provide good control and monitoring means such that the service provider can make sure that the offered quality for a particular type of service is fulfilled by means of sufficient bandwidth being provided.

In computer networks, data is transmitted in data packets. The type of data network of the service provider may vary. Examples of different types of data networks are Ethernet, Token Ring, Dynamic synchronous Transfer Mode (DTM), Asynchronous Transfer Mode (ATM) and (POS) Packet over Synchronous optical networking (SONET)/Synchronous Digital Hierarchy (SDH). The data network of the service provider can be connected to the Internet by means of at least one gateway/router which functions as a boarder gateway between the Internet and the data network of the service provider. The gateway/router is adapted to exchange routing data between different types of protocols. Internet is based on the protocol suite called Internet Protocol (IP). The data network of the service provider is also based on IP. Data packets which originate from the data network of the service provider and are to be transmitted out on the global Internet must be routed to the destination IP based on routing information obtained via a routing protocol.

The data network of the service provider typically further comprise routers routing the data packets within the data network and access nodes at the periphery of the data network adapted to connect client devices to the data network. Examples of client devices are a Voice over IP (VoIP) phone, a game consol, a set-top-box (STB), a network radio or a computer (PC). The client devices are connected to the access nodes via client interfaces, such as e.g. fiber converters, modems such as Asymmetric Digital Subscriber Line (ADSL) modems, Home Gateways, Optical Line Termination (OLT), Ethernet Switches, Routers, etc. The client interface is typically also built into the client device, such as an Ethernet interface or a modem inside a computer. In the case of a home or business local network with several client devices, it is common for the local network to use a single point of connection, i.e. only one client interface, such as e.g. a Customer Premises Equipment (CPE) or a Residential Gateway (RG). I.e. several different client devices are connected to the access node of the service provider's data network via only one client interface.

As mentioned above, each client interface can have several different client devices, enabling different services, connected to the service provider's data network. These different services, enabled by the different client devices often have different requirements regarding network Quality of Service (QoS), such as e.g. different requirements regarding performance, tolerance to packet loss, low latency, delay variation and/or bandwidth. The data networks of today are built to support multiple services requiring different levels of Quality of Service (QoS). Many different approaches to obtain QoS are used, such as Resource ReSerVation Protocol (RSVP) which is used by routers to request and/or deliver specific levels of QoS for application data streams or flows. Other examples are Integrated Services (IntServ) and Differentiated Services (DiffServ). IntServ explicitly manages the network resources to provide QoS to specific user packet streams/flows in networks. DiffServ first categorizes the data traffic into a standardized set of traffic classes, such as e.g. the Class of Service (CoS). The data of the traffic classes is thereafter treated differently to differentiate service. For example, each traffic class may be subject to a different rate limit, shaped separately and/or prioritized relative to other traffic classes.

Today the configuration of these network QoS and or CoS levels are static and enforced when the end-user traffic reach a node controlled by the network operator, i.e. the access node such as e.g. DSLAM and/or the edge router at the ingress or egress point of the data network. By enforced means that the node controlled by the network operator, i.e. the access node and/or the edge router, is adapted to re-set the QoS settings. This may be the case if the client device sends in data traffic with wrong QoS settings, such as e.g. highest priority, then the node re-sets the QoS setting to the QoS settings previously agreed upon.

The existing technology for setting up the QoS handling is by pre-configured policies in the network. The setting up technology is limited to the nodes and devices under direct control of the network operator. Signaled reservations such as RSVP also exist, but these reservations puts very high demand on the network nodes to keep reservation states. This makes it difficult to get end-to-end network QoS all the way from the client device to the service/network provider's service equipment such as e.g. video server, game server, voice gateway, etc., since the client device seldom is controlled by the network operator.

Because of these limitations most of the current network implementations have a "one service per client device", meaning that one client interface is connected to only one service. In these implementations, it is quite common that the client interface of the client device is connected to a specific port of a residential gateway, access node, switch or router giving specific QoS settings. These QoS settings are not applicable in the client device, thus this is not end-to-end QoS. Further it is not possible for one client device and/or one client interface to support multiple services with different QoS parameter settings using this method, since all traffic from the client interface of the client device gets the same QoS treatment.

Sometimes, when the client device is at least partly controlled by the provider, specific configuration in the client interface of the client device is used to identify the client device and set the appropriate QoS for that client device. Such specific configuration may be e.g. the physical address of the client interface such as the Media Access Control (MAC) address or the logical address of the client interface such as the IP address of the client interface. However, these approaches give limitations in using multiple services per device or requires complicated configuration of the client interface of the client device, and quite often this client interface is not under the control of the service provider.

Another way of achieving QoS is to use the Dynamic Host Configuration Protocol (DHCP). DHCP is a protocol used by networked devices such as client devices to obtain various parameters, such as Internet Protocol (IP) address, necessary for the networked client devices to operate in an IP network. A DHCP server manages a pool of IP addresses and information about client configuration parameters such as e.g. the "default gateway". The "default gateway" is the network node of a data network that serves as the exit point to other networks. According to the DHCP dynamic allocation mode for allocating IP addresses each DHCP client in a data network is configured to request an IP address from the DHCP server during network initialization. This is a request-and-grant process which uses a lease concept with a controllable time period which means that the requested and granted IP address is only valid during a specified time period, thus allowing the DHCP server to reclaim (and then reallocate) IP addresses that are not renewed, i.e. dynamic re-use of IP addresses. The DHCP concept also includes DHCP forwarders and DHCP intermediate agents adapted to propagate the broadcast DHCP message across the router interfaces, without any special processing and DHCP Relay Agents, which relays DHCP messages between DHCP clients and DHCP servers wherein the DHCP clients and DHCP servers may be located on different IP networks. The DHCP Relay agent intercepts the DHCP messages and makes changes to the DHCP Message, such as forwarding the DHCP Message via a directed datagram to a specific DHCP Server, such as e.g. to the DHCP server dedicated to the subnet wherein the DHCP client who sent the DHCP message is located. The DHCP Relay Agent is configured with addresses of DHCP Servers to which they should relay the DHCP Messages.

The DHCP protocol may be used to set QoS parameters, such as CoS parameters, in client devices but these are limited to one logical address, such as e.g. the Ethernet/IP address, and/or one QoS category such as e.g. one Ethernet Priority bit (P-bit) and/or IP Type Of Service (TOS) and/or DiffServ CoS per client device and/or client interface.

This means that all data traffic from the client interface of the client device gets the same QoS treatment. This works for a single service device like a Voice over IP phone. However it is not possible for one device to support multiple services with different QoS parameter settings, since all traffic from the device gets the same QoS treatment.

Thus it is difficult to get end-to-end QoS all the way from a client device, and even more difficult to use different QoS for different services from one single client device. The same problems arise for the case of a local home or business network with several client devices connected to the data network using only one common client interface wherein the data network provides the IP addresses, such as e.g. by the use of network and/or port address translation gateways.

SUMMARY

The objective problem is to provide methods and arrangements enabling multiple services with different QoS settings in one single client device. It is therefore an object of the present invention to provide methods and arrangements for service specific configuration of QoS, preferably end-to-end QoS, in a client device.

In accordance with a first aspect of the invention the object is achieved by a method for establishing a service specific QoS configuration in a client device. The client device is adapted to be connected to a data network. The data network comprises a service management server. The method comprises the steps of sending a request message comprising a service configuration to the server and receiving an acknowledgement message comprising the service configuration requested by the client device, from the server. The requested service configuration comprises information regarding service specific QoS configuration.

In accordance with a second aspect of the invention the object is achieved by a client device being adapted to be connected to a data network. The data network comprises a service management server. The client device comprises a sending unit adapted to send a request message comprising a service configuration request to the server. The client device further comprises a receiving unit adapted to receive an acknowledgement message comprising the requested service configuration from the server. The requested service configuration comprises information regarding QoS configuration which configuration is service specific.

In accordance with a third aspect of the invention the object is achieved by a method for establishing a service specific QoS configuration, in a service management server. The server is arranged to be comprised in a data network. The data network further comprises at least an intermediate node. The server is adapted to be connected to a client device. The method comprises the following steps: The first step is to receive a request message comprising a service configuration request from the client device. The second step is to make a final binding of the requested service specific QoS service configuration information for a service management client in the client device. The third step is to send an acknowledgement message comprising the final bound service configuration requested by the client device to the client device. The requested service configuration comprises information regarding service specific QoS configuration.

In accordance with a fourth aspect of the invention the object is achieved by a service management server. The server is arranged to be comprised in a data network. The server is adapted to be connected to a client device. The server comprises a receiving unit which is adapted to receive a request message from the client device. The request message comprises a service configuration request. The server further comprises a reservation unit which is adapted to make a final reservation of the requested service specific QoS service configuration for a service management client in the client device. The server further comprises a sending unit which is adapted to send an acknowledgement message to the client device. The acknowledgement message comprises an acknowledgement of the final bound service specific QoS configuration information.

In accordance with a fifth aspect of the invention the object is achieved by a method in an intermediate node for establishing a service specific QoS configuration. The intermediate node is comprised in a data network. The node being adapted to be connected to a service management server comprised in the data network and to a client device. The method comprises the first step of receiving an acknowledgement message addressed to the client device from the server. The acknowledgement message comprises a service configuration requested by the client device. The requested service configuration comprises information regarding service specific QoS configuration. The method comprises the second step of configuring the service according to the acknowledged service specific QoS configuration information. The method further comprises the third step of sending the received acknowledgement message to the client device. The acknowledgement message comprises the requested service configuration which requested service configuration comprises information regarding QoS configuration. The QoS configuration is service specific.

In accordance with a sixth aspect of the invention the object is achieved by an intermediate node comprised in a data network. The node is adapted to be connected to a service management server comprised in the data network and to a client device. The client device is adapted to be connected to the data network. The intermediate node comprises a receiving unit adapted to receive an acknowledgement message addressed to the client device from the server. The acknowledgement message comprises a service configuration requested by the client device. The requested service configuration comprises service specific QoS configuration information. The intermediate node further comprises a configuring unit adapted to configure the service according to the acknowledged service specific QoS configuration information. The intermediate node further comprises a sending unit adapted to send the received acknowledgement message to the client device. The acknowledgement message comprises a requested service configuration which requested service configuration comprises service specific QoS configuration information.

An advantage of the present invention is that the methods and network nodes according to the present solution enables an automatic, lightweight way of conveying QoS parameters dynamically to end-devices, such as client devices as well as intermediate nodes, such as access nodes, switches and edge routers, to achieve end-to-end QoS. This is very important in networks with multiple services per client device and/or client interface/CPE wherein the multiple services require different levels of network QoS, and are connected via different types of access.

A further advantage of the present invention is that the quality of service configuration may end-to-end. This may be achieved by a method in a client device for establishing a service specific QoS configuration, which client device is adapted to be connected to a data network. The data network comprising a service management server. The method comprising the steps of firstly, sending a request message to the server, the request message comprises a service configuration request, and secondly, receiving an acknowledgement message from the server. The acknowledgement message comprises the service configuration requested by the client device which requested service configuration comprises information regarding service specific QoS configuration. The third step may be to configure the service and/or services according to the acknowledged service specific QoS configuration information.

A further advantage of the present invention is that intermediate nodes are given the same QoS information as the client, whereby the intermediate nodes may enforce the QoS information in the intermediate node.

A further advantage of the present invention is that intermediate nodes may classify and set QoS configuration for data packets from clients that do not apply the QoS information provided.

BRIEF DESCRIPTION OF THE DRAWINGS

FIGS. 4, 6 and 8 are flow charts illustrating embodiment of a method in a data network.

FIGS. 5, 7 and 9 are schematic block diagrams illustrating nodes in a data network.

FIG. 10 is a schematic view of a signalling message according to some embodiments of the invention.

DETAILED DESCRIPTION

The basic concepts of the present solution are methods and arrangements for service specific configuration of end-to-end QoS in a client device. According to some embodiments the service specific configuration of end-to-end QoS in a client device is performed by service management signaling which may be executed by a service management server, a service management client and/or a service management agent. According to some embodiments of the present solution the service management signaling is performed as Dynamic Host Configuration Protocol (DHCP) signaling being extended compared to prior art. The present solution may also be applicable for DHCP for Ipv6.

The invention is defined as methods and arrangements which may be put into practice in the embodiments described below.

Figure 1:
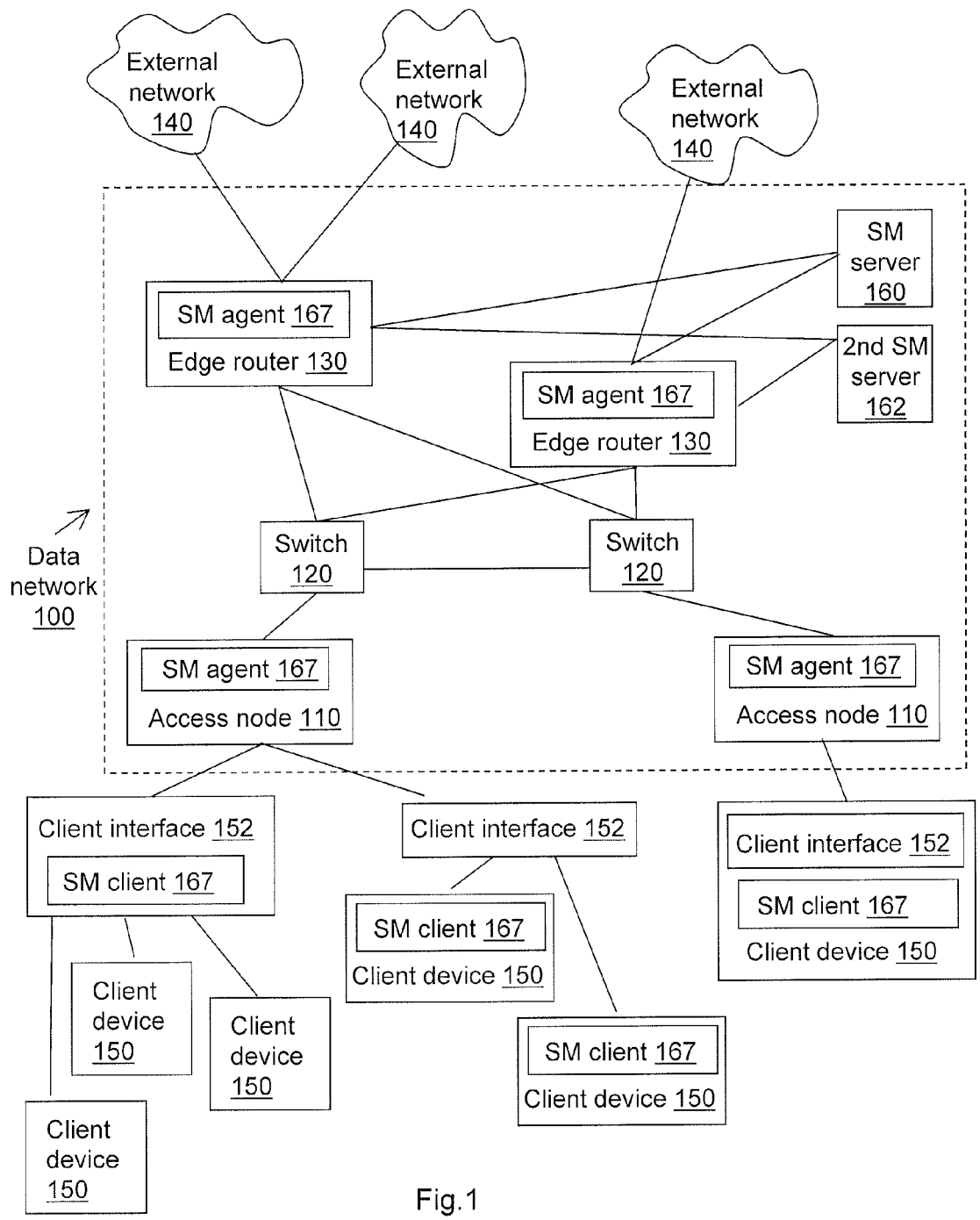
FIG. 1 is a schematic block diagram illustrating a data network.

FIG. 1 presents an exemplary scenario of a data network 100 of a service provider comprising intermediate nodes 110, 120, 130. Examples of different types of data networks are Ethernet, Token Ring, Dynamic synchronous Transfer Mode (DTM), Asynchronous Transfer Mode (ATM) and (POS). FIG. 1 shows two access nodes 110, two switches 120 and two edge routers 130, but these numbers may be considerably larger or smaller. The intermediate nodes may be access nodes 110, switches 120, and at least one edge router 130. The edge router 130 is adapted to route data packets between different types of networks and is thus adapted to connect the data network 100 to external networks and/or equipments 140 such as e.g. the Internet or other service provider networks, enabling connectivity to external services and networks. The data network 100 offers multiple services which may be implemented as multiple edge routers 130 interfacing the different services each placed in a different external network 140, such as e.g. IP subnets. Each edge router 130 may interface one or several different external networks 140. Examples of edge routers 130 are Ethernet switches/routers or Multi Service Edge Router (MSER), Broadband Access Server (BRAS), Broadband Network Gateway (BNG) and Mobile-Access Gateway (Mobile-AGW). The switches 120 are adapted to switch the data packets within the data network 100. The access nodes 110 are adapted to connect client devices 150 to the data network 100. Examples of access nodes 110 are e.g. a Digital Subscriber Line Access Multiplexer (DSLAM) or a Passive Optical Networks Optical Line Termination (PON-OLT) and Ethernet switches.

The client device 150 is connected to the data network 100 via a client interface 152. The client device 150 may be e.g. a Voice over IP (VoIP) phone, a game consol or a computer, etc. Examples of client interfaces 152 are e.g. a Residential Gateway (RG), a Passive Optical Networks Optical Network Termination (PON-ONT), a Third Generation (3G) home base station and a Digital Subscriber Line (xDSL) modem. The client interface 152 may be internal or external to the client device 150. An example of an internal client interface 152 is an Ethernet network interface or a modem inside a computer. An external client interface 152 may be connected to several client devices 150, such as in the case of a local network client with several client devices. This means that several different client devices are connected to the access node of the service provider's data network via only one client interface, as seen in FIG. 1. Examples of external client interfaces 152 connecting several client devices 150 are e.g. a Customer Premises Equipment (CPE) or a Residential Gateway (RG).

The data network 100 further comprises a service management server 160, such as e.g. a DHCP server. The data network 100 may also comprise at least one second service management server 162. Each client device 150 and/or client interface 152 may comprise a service management client 165, such as e.g. a DHCP client. The service management server 160 and second service management server 162 are adapted to communicate with the service management clients 165, e.g. using service management messages such as e.g. DHCP messages. Further may the intermediate nodes 110, 120, 130 of the network 100, such as e.g. access node 110, switch 120, and edge router 130 comprise a service management agent 167, such as e.g. a DHCP relay agent, DHCP intermediate agent, or a DHCP forwarding agent. The service management agent 167 is adapted to propagate and/or process the service management messages sent from the service management clients 165 to the service management server 160 and to the second service management servers 162 and vice versa. From now on the service management server 160, second service management server 162, service management client 165 and service management agent 167 will be called server 160, second server 162, client 165 and agent 167 respectively.

Figure 2:
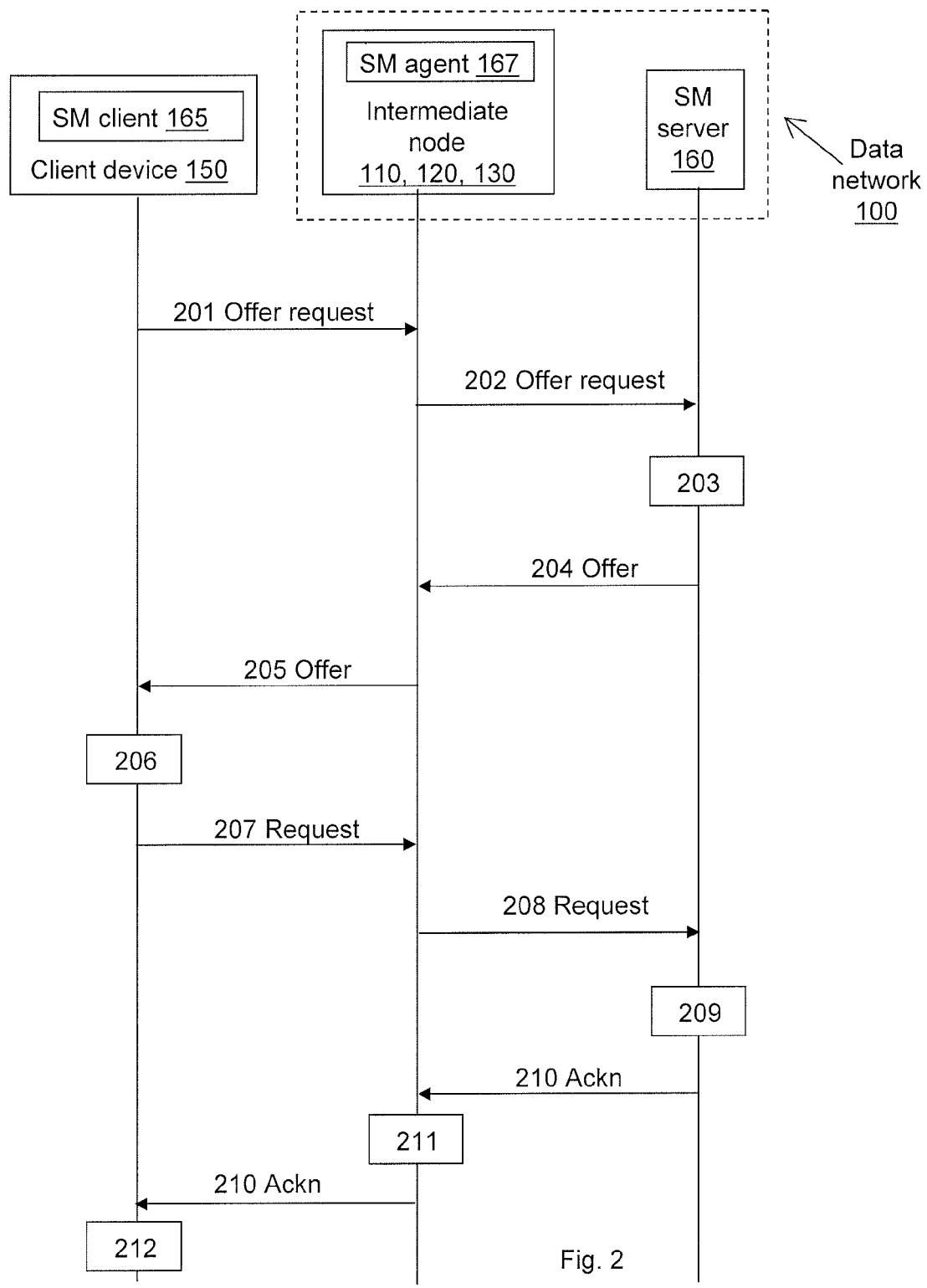
FIGS. 2 and 3 are combined flowchart and signalling schemes illustrating some embodiments of a method in a data network.

FIG. 2 is a signalling scheme presenting a schematic view of the steps performed according to some embodiments wherein service specific configuration of end-to-end QoS is performed in a network 100 during initialization of a requested service. The requested service may be e.g. a Voice over IP communication, Internet connectivity, media streaming etc. The schematic view of FIG. 2 corresponds to the embodiments wherein the network 100 comprises a server 160. FIG. 2 shows the client device 150 comprising the client interface 152, which may be internal or external to the client device 150. The client device 150 is adapted to be connected to a network 100 via an intermediate node such as e.g. an access node 110.

201. The client device 150 sends an offer request message, requesting service configuration information. This is performed to initiate the service. The requesting of the service configuration information is typically initiated immediately after booting when the client device 150 and/or client interface 152 connects to the network 100, and the request may preferably be completed before the client device 150 and/or client interface 152 performs the requested service.

According to some embodiments wherein the client device 150 or the client interface 152 comprises a client 165, this step may be performed by the client 165.

According to some embodiments wherein the client 165, is a DHCP client this step is performed using DHCP signaling. The offer request message may be a broadcast query such as e.g. a DHCP Discover. A DHCP Discover message requests necessary information from a DHCP server. The DHCP client may broadcast on the physical subnet to find available DHCP servers.

202. The access node 110 has received the offer request message from the client device 150 and forwards it to the server 160.

According to some embodiments the access node 110 comprises a service management agent 167, from now on called the agent 167.

According to some embodiments the agent 167 may be e.g. a DHCP relay agent or a DHCP forwarding agent or a DHCP intermediate agent. The agent 167 may intercept the received broadcast DHCP Discover message and may perform processing to be adapted to forward the message as a direct addressed DHCP Discover message to the service management sever 160 of the network 100. The processing may comprise making changes to the received DHCP Messages, such as changing broadcast message to a direct addressed message using stored address information for DHCP servers, or adding DHCP option information such as Relay Agent Information Option (option 82).

203. The server 160 has received the offer request message originating from the client device 150. Upon receipt of a valid offer request message, the server 160 obtains an offer for a service configuration for the requested service configuration. The server 160 further makes a preliminary binding of the offered service configuration for the client device 150. The offered service configuration comprises service specific QoS configuration information. When the server 160 offers service configuration, such as e.g. an IP address, to the client device 150 the server 160 also offers at least one edge router 130 for the client device 150 to send its traffic to.

According to the embodiments wherein the server 160 is a DHCP server, the offer request may be obtained from the DHCP server internal pool of IP addresses and information. The offer for a service configuration may comprise configuration parameters such as e.g. the IP address that the DHCP server is offering the client device 150, the subnet mask, the lease duration (the length of time for which the allocation is valid), the default gateway, i.e. edge router 130 whereby the requested service is obtained and the IP address of the DHCP server making the offer. When the DHCP server provides an IP address to the client device 150, the DHCP server also may give out at least one edge router 130 for the client device 150 to send its traffic to using DHCP option 3. In data networks 100 offering multiple services it may also be possible to have multiple edge routers 130 for different services. DHCP can also be used to communicate these multiple edge routers 130 or external network 140 to the client device 150 using DHCP option 33 and/or DHCP option 121. By extending the DHCP information with QoS parameters for the external networks 140 or specific IP addresses of the edge routers 130 that require certain QoS handling, the client device 150 can configure the correct QoS for the data traffic to give end-to-end QoS. In addition to the destination IP address or the at least one edge router 130 the QoS information may also include the TCP/UDP destination port as well. This makes the QoS configuration information service specific. The TCP/UDP destination port is also under the control of the network operator and requires no static configuration of client devices 150 and/or client interfaces 152.

204. Then the server 160 sends an offer message comprising an offer of the service specific QoS configuration information across the data network 100 addressed to the client device 150.

According to the embodiments wherein the server 160 is a DHCP server, the offer message may be a DHCP Offer message comprising the preliminary bound QoS configuration information.

205. The access node 110 forwards the received offer message, which offer message is addressed to the client device 150, to the client device 150.

206. The client device 150 selects and accepts the offer that was comprised in the received offer message. The offer message comprised service specific QoS configuration information.

According to the embodiments wherein the client device 150 or the client interface 152 comprises a client 165 this step is performed by the client 165.

According to the embodiments wherein the client 165 is a DHCP client then the DHCP client selects and accepts the offer message which may be a DHCP offer message.

207. The client device 150 sends a request message to the server 160. The request message comprises the IP address of the server 160, i.e. the IP address of the server that made the offer which was selected.

According to the embodiments wherein the client device 150 or client interface 152 comprises a client 165 then the client 165 sends the request message 250 to the server 160.

According to the embodiments wherein the client 165 is a DHCP client then the DHCP client may send the request message which may be a DHCP Request message. Thus, the DHCP client sends the DHCP request message comprising the IP address of the DHCP server that made the offer.

208. The access node 110 forwards the received request message to the server 160.

According to some embodiments the access node 110 comprises an agent 167 which may process the received request message.

The agent 167, such as e.g. a DHCP relay agent or a DHCP forwarding agent or a DHCP intermediate agent, may intercept the DHCP Request message. The DHCP relay agent may perform processing to be adapted to forward the message as a direct addressed DHCP Request message to the service management sever 160.

209. Upon receipt of a request message originating from the client device 150 the server 160 makes a final binding of the requested offered service configuration for the client device 150. The requested offered service configuration comprises the service specific QoS configuration information.

According to the embodiments wherein the server 160 is a DHCP server, the DHCP server makes the final binding of the requested offered service specific QoS service configuration for the client 165 such as the DHCP client, of the client device 150. At this point, the TCP/IP and network QoS configuration process is complete.

210. The server 160 sends an acknowledgement message comprising the final bound service specific QoS configuration information across the data network 100 to the client device 150.

According to the embodiments wherein the server 160 is a DHCP server then the acknowledgement message sent to the DHCP client, may be a DHCP Acknowledgement message packet.

211. The access node 110 forwards the received acknowledgement message to the client device 150. The acknowledgement message being addressed to the client device 150 was received from the server 160.

According to some embodiments the intermediate node, such as the access node 110, Ethernet switch 120 or the edge router 130, comprises an agent 167 which may perform processing.

The agent 167, such as e.g. a DHCP relay agent or a DHCP forwarding agent or a DHCP intermediate agent, may intercept the DHCP messages and may perform processing, such as e.g. snooping and/or configuring/registering of the acknowledged service specific QoS service. This enables the intermediate node, such as the access node 110 or the edge router 130, to check that the service to be configured when performed is performed according to the acknowledged QoS. If not, i.e. the received data traffic from the client device 150 is of a QoS configuration other than the previously acknowledged, the intermediate node may adjust the service configuration to the acknowledged service specific QoS configuration.

212. According to some embodiments the client device 150 performs the service configuration according to the service specific QoS configuration information in the received acknowledgement message. This configuration behavior enables end-to-end service specific QoS, i.e. in this case between the client device 150 and the edge router/service destination.

According to other embodiments the client device 150 may configure the acknowledged service without the service specific QoS configuration information. This configuration behavior results in that the service specific QoS service configuration is applied within the network 100, i.e. between the intermediate nodes, in this case between the access node 110 and the edge router/s 130 but not between the client device and the intermediate node.

According to the embodiments wherein the client device 150 comprises a client 165, it is the client 165 that performs the configuration.

According to the embodiments wherein the client 165 may be a DHCP client then the received acknowledgement message may be a DHCP acknowledgement message. The DHCP client may configure its network interface (=client interface 152) with the supplied network QoS options using Class Of Service on Ethernet or IP towards specific IP networks and optionally TCP/UDP ports included in the packet such as the lease duration and any other configuration information.

Figure 3:
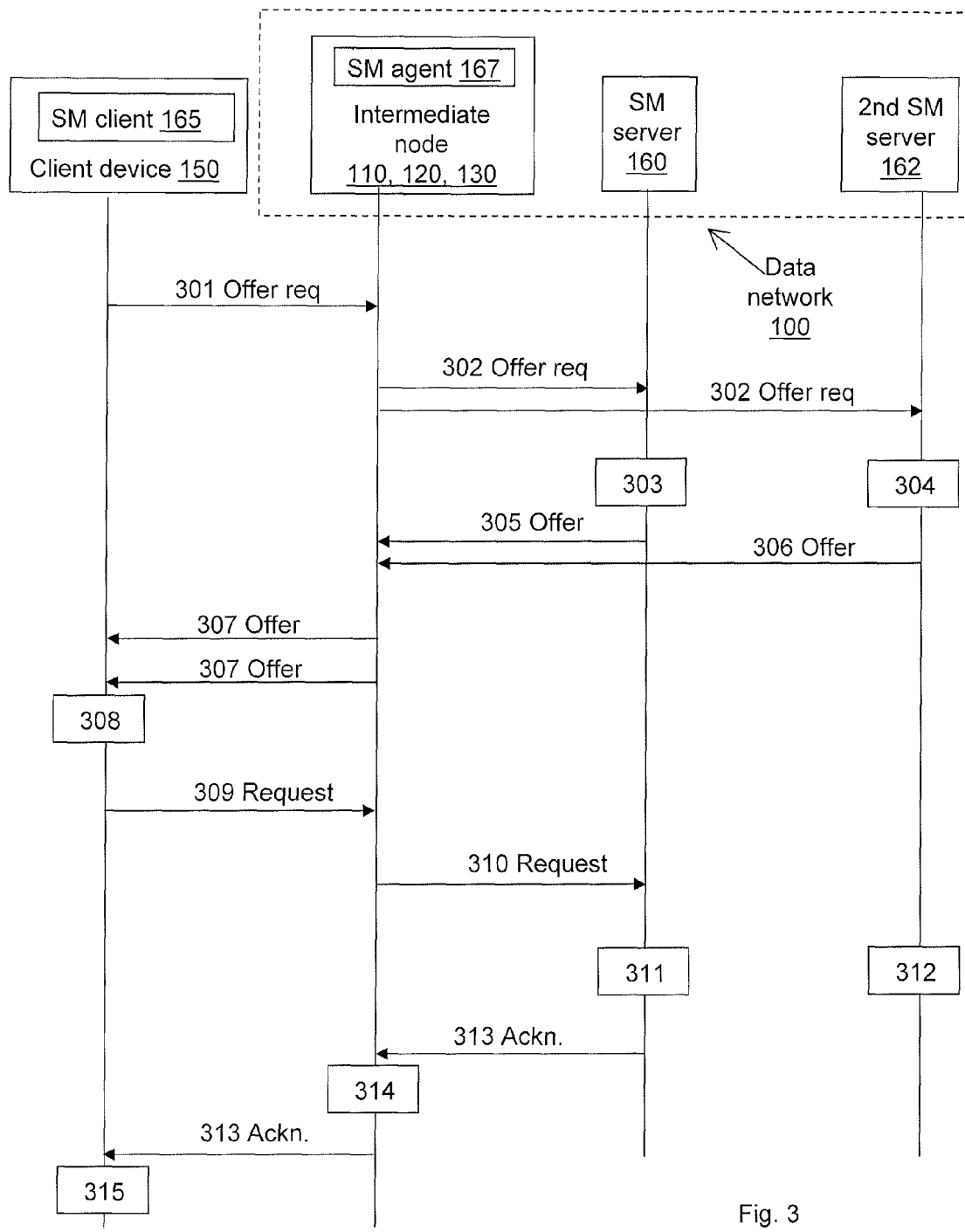

FIG. 3 presents a schematic view of the steps performed according to some embodiments wherein service specific configuration of end-to-end QoS is performed in a network 100 during initialization of a requested service. The requested service may be e.g. a Voice over IP communication, Internet connectivity, media streaming etc. The schematic view of FIG. 3 corresponds to the embodiments wherein the network 100 comprises a server 160 and a second server 162. FIG. 3 further shows a client device 150 comprising a client interface 152, which may be internal or external to the client device 150. The client device 150 is adapted to be connected to a network 100 via an intermediate node such as an access node 110.

301. The client device 150 sends an offer request message requesting service configuration information which is performed in the same way as described in method step 201.

302. The access node 110 receives the offer request message from the client device 150. The offer request message is forwarded to the server 160 and to the second server 162.

According to some embodiments the offer request message may be forwarded to the upstream network to the edge router 130. The edge router 130 receives the offer request message 200 and may forward it to the server 160 and to the second server 162.

According to some embodiments the access node 110 comprises a service management agent 167, from now on called the agent 167.

The agent 167 may e.g. be a DHCP relay agent or a DHCP forwarding agent or a DHCP Intermediate agent. The agent 167 performs the sending according to the description of method step 202 with the following additions: The processing performed by the agent 167 may further comprise sending the received message as a direct addressed message to the second server 162 as well as to the server 160.

303. The server 160 obtains an offer and makes a preliminary binding of the service configuration information in the received offer request message originating from the client device 150. This step is performed in the same way as described in method step 203.

304. The second server 162 acts in the same way as the server 160, i.e. makes a preliminary binding 320 of the offered service configuration for the client device 150, as described above in method step 203.

305. The server 160 sends an offer message comprising an offer of the service specific QoS configuration information across the data network 100 to the client device 150 which is performed in the same way as described in method step 204.

306. *The second server 162 also sends an offer message comprising an offer of the service specific QoS configuration information across the data network 100 to the client device 150. This step is performed in the same way as described in method step 204 but with the difference that second server 162 is the sending server and not the server 160 as described by method step 204.

307. The access node 110 receives the offer message being addressed to the client 150 from the server 160 and the offer message being addressed to the client 150 from the second server 162. The access node 110 then forwards the offer messages from the server 160 to the client device 150 and the offer message from the second server 162 to the client device 150.

308. The client device 150 receives an offer message from the server 160 and an offer message from the second server 162. The received offer messages comprise service specific QoS configuration information. The client device 150 may accept only one of the received offers. A received offer may be accepted either on the grounds "first to arrive" or based on the configuration parameters offered in the offer message. In the example of FIG. 3, the client device 150 accepts the offer originating from the server 160.

According to the embodiments wherein the client device 150 or the client interface 152 comprises a client 165 which receives the offer messages and accepts one of the received offers.

According to the embodiments wherein the client 165 is a DHCP client then the DHCP client accepts one of the offer messages which may be DHCP offer messages.

309. The client device 150 may inform the server 160 or the second server 162 that the client device 150 has accepted an offer. To do this, the client device 150 may send a request message containing the IP address of the server that made the offer which has been selected, i.e. in this case the IP address of the server 160. Thus, the client device 150 sends a request message which may comprise the service specific QoS configuration information received in the offer message to the server 160.

According to the embodiments wherein the client device 150 or client interface 152 comprises a client 165 then the client 165 may send the request message to the server 160 and/or to the second server 162. In the example of FIG. 3 wherein the client device 150 accepts the offer originating from the server 160 the client 165 may send the request message to the server 160 only.

According to the embodiments wherein the client 165 is a DHCP client then the DHCP client may send the request message which may be a DHCP Request message. The DHCP client may broadcast or multicast the DHCP request message which comprises the IP address of the DHCP server that made the accepted offer.

310. The edge router 130 forwards the received request message to the server 160 which was selected by client device 150. If the second server 162 would have been selected by the client device 150 then the edge router 130 may have forwarded the received request message to the second server 162.

According to some embodiments the edge router 130 comprises an agent 167 which may process the received request message.

The agent 167, such as e.g. a DHCP relay agent or a DHCP forwarding agent, may intercept the broadcast DHCP Request message and may perform processing to be adapted to forward the message as a direct addressed DHCP Request message to the service management server 160 or to the second server 162.

311. The server 160 makes a final binding of the received requested offered service configuration for the client device 150. This step is performed in the same way as described in method step 209.

312. Since the second server 162 does not receive a request message, the second server 162 realizes that their configuration offer was not accepted. Thus the second server 162 may release their offered configuration information and return them to their available pools.

According to the embodiments wherein the second server 162 is a DHCP server then the DHCP server may release the preliminary binding of the requested offered service specific QoS service configuration for the client device 150 and return the offered resources to their available pools.

313. The server 160 sends an acknowledgement message comprising the final bound service specific QoS configuration information across the data network 100 addressed to the client device 150. This step is performed in the same way as described in method step 210.

314. The access node 110 forwards the received acknowledgement message, which is addressed to the client device 150, to the client device 150. This step is performed in the same way as described in method step 211.

315. The client device 150 receives the acknowledgement message and acts according to the description in method step 212.

Figure 4:
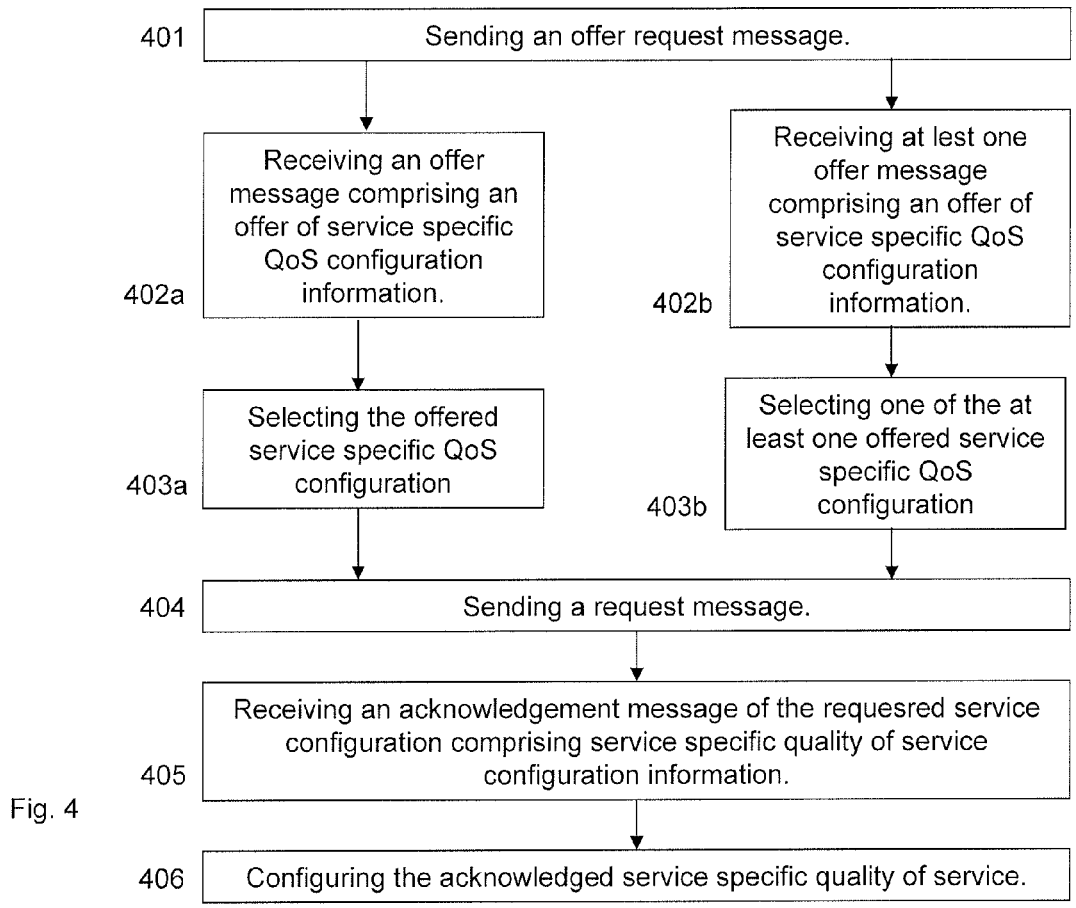

FIG. 4 presents the method steps, performed by a client device 150, for establishing a service specific QoS configuration, according to a first alternative of some of the embodiments. The client device 150 is adapted to be connected to a data network 100, which data network 100 comprises a service management server 160. According to some embodiments the client device 150 may comprise a service management client 165 which may perform the method steps according to any of the method steps 401-406. According to some embodiments may any of the method steps 401-406 be performed by means of Dynamic Host Configuration Protocol (DHCP) signalling.

401. According to some embodiments the client device 150 sends an offer request message to the server 160. The offer request message comprises a request for a service configuration offer. According to the embodiments wherein the network 100 further comprises at least one second service management server 162, then the client device 150 may send an offer request message to the server 160 and to the second server 162, the offer request message comprising a request for a service configuration offer. The offer request message may comprise a configuration request regarding multiple services.

402. According to some embodiments the client device 150 may receive an offer message from the server 160, the offer message comprising an offer of service specific QoS configuration information. According to some embodiments wherein the data network 100 further comprises a second server 162 the client device 150 may receive at least one offer message from any of the server 160 and/or the at least one second server 162. Each of the at least one received offer messages comprises an offer of service specific QoS configuration information. The service configuration information may comprise a destination address being associated to the requested service configuration. The destination addresses may be Internet Protocol (IP) addresses or Transport Control Protocol/User Datagram Protocol (TCP/UDP) destination ports or combinations of IP addresses and TCP/UDP ports. The QoS configuration information comprised in the service configuration information may comprise a QoS value being associated to the destination address.

403. Further according to some embodiments the client device 150 may select the offered service specific QoS configuration received from the server 160, which selected service specific QoS configuration may be used for performing the next method step of sending a request message to the server 160. The offer message may comprise a respective service configuration for each requested service and wherein each service configuration is service specific. According to some embodiments wherein the data network 100 further comprises a second server 162 the client device 150 may select 403 one of the at least one offered service specific QoS configuration received from any of the server 160 and/or the at least one second server 162. The selected service specific QoS configuration may be used for performing the next step of sending a request message to the server 160 or second server 162.

404. In this step the client device 150 sends a request message to the server 160, the request message comprising a service configuration request. The request message may comprise a configuration request regarding multiple services.

405. The client device receives an acknowledgement message from the server 160. The acknowledgement message comprises the service configuration requested by the client device 150. The requested service configuration comprises information regarding service specific QoS configuration. The acknowledgement message may comprise a respective service configuration for each requested service and wherein each service configuration may be service specific.

406. In this step the client device may configure the service and/or services according to the acknowledged service specific QoS configuration information.

Figure 5:
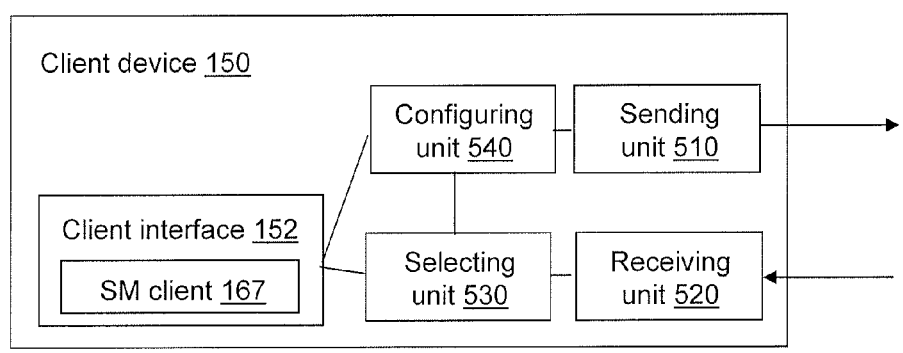

To perform the method steps 401-406 in the client device 150 for establishing a service specific QoS configuration, according to a first alternative of some of the embodiments, the client device 150 is arranged as depicted in FIG. 5. The client device 150 is adapted to be connected to the data network 100. The data network 100 comprises a service management server 160. The client device 150 comprises:

a sending unit 510 which is adapted to send a request message to the server 160. The request message comprises a service configuration request. The sending unit 510 may further be adapted to send an offer request message to the server 160. The offer request message may comprise a request for a service configuration offer. According to the embodiments wherein the network 100 further comprises at least one second service management server 162, may the sending unit 510 further be adapted to send an offer request message to the server 160 and to the second server 162. The offer request message may comprise a request for a service configuration offer.

a receiving unit 520 which is adapted to receive an acknowledgement message from the server 160. The acknowledgement message comprises a requested service configuration. The requested service configuration comprises information regarding QoS configuration which configuration is service specific. The receiving unit 520 may further be adapted to receive the offer message from the server 160. The offer message may comprise an offer of service specific QoS configuration information. According to the embodiments wherein the network 100 further comprises at least one second service management server 162, may the receiving unit 520 further be adapted to receive at least one offer message from any of the server 160 and/or the at least one second server 162, each of the at least one received messages comprising an offer of service specific QoS configuration information, According to some embodiments the client device 150 may further comprise a selecting 530 unit which may be adapted to select the offered service specific QoS configuration received from the server 160. According to the embodiments wherein the network 100 further comprises at least one second service management server 162, may the selecting unit 530 further be adapted to select one of the at least one offered service configuration received from any of the server 160 and/or the at least one second server 162.

According to some embodiments may the client device 150 further comprise a configuring unit 540 which may be adapted to configure the acknowledged service specific QoS.

According to some embodiments the client device 150 may further comprise a service management client 165 which may be adapted to send the offer request message, receive the at least one service configuration offer message, select one of the at least one offered service configuration received, send the request message and receive the acknowledgement message and configure the acknowledged service specific QoS. The service management client 165 may be represented by a Dynamic Host Configuration Protocol (DHCP) client.

Figure 6:
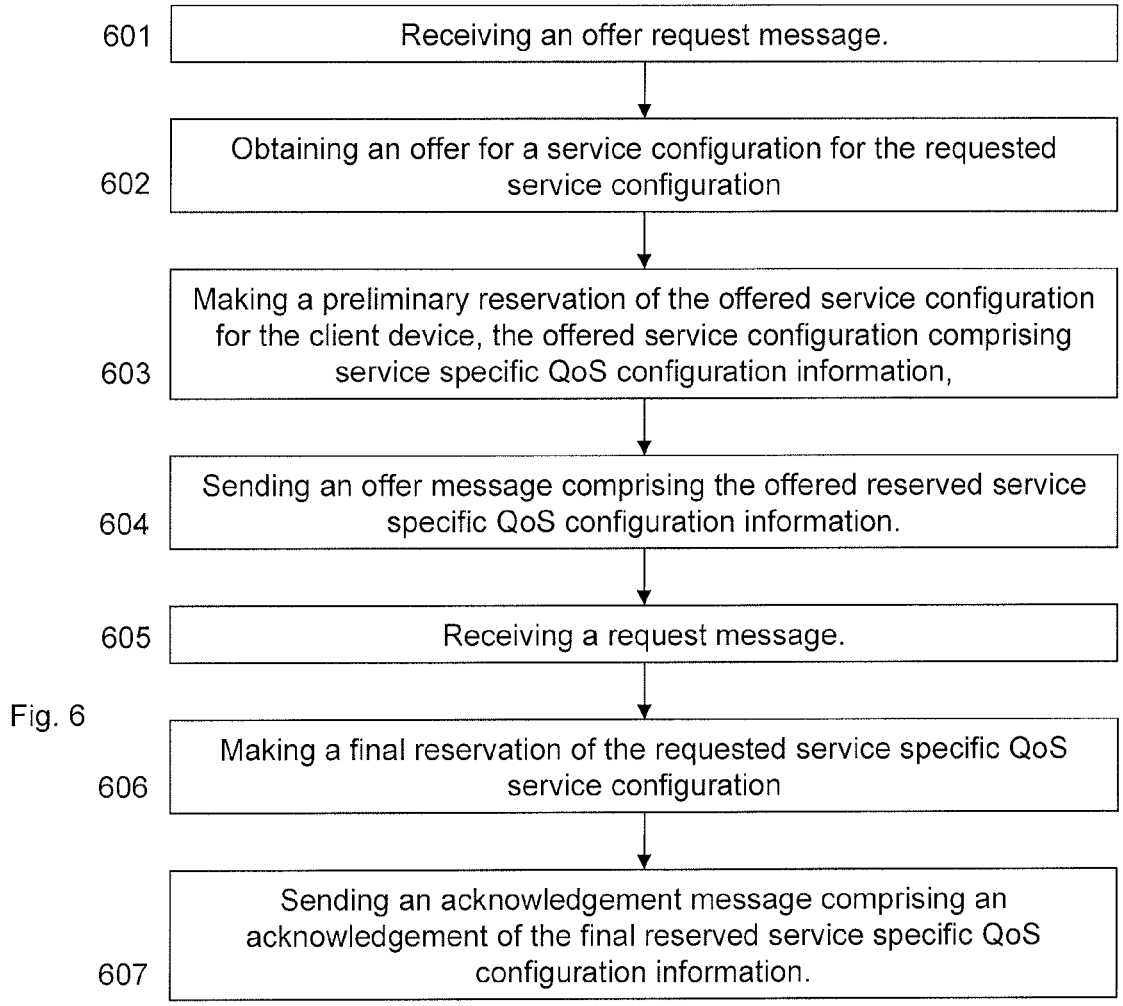

FIG. 6 presents the method steps, performed by a service management server 160, for establishing a service specific QoS configuration, according to a first alternative of some of the embodiments. The server 160 is arranged to be comprised in a data network 100. The data network 100 further comprises an intermediate node 110, 120, 130. The server 160 is adapted to be connected to a client device 150. According to some embodiments may any of the method steps 601-607 be performed by means of DHCP signalling. The method comprises the following method steps:

601. According to some embodiments the server 160 may receive an offer request message from the client device 150. The offer request message may comprise a service configuration offer request.

602. According to some embodiments the server 160 may obtain an offer for a service configuration for the requested service configuration. According to some embodiments the service configuration information may comprise a destination address being associated to the requested service configuration. According to some embodiments the QoS configuration information may be comprised in the service configuration information. The service configuration information may comprise a QoS value which may be associated to a/the destination address. The destination address may be associated to the requested service. According to some embodiments may the QoS values correspond to Class of Service information according to Differentiated Services (DiffServ), Type Of Service (ToS) or Ethernet Priority (P-bit).

603. According to some embodiments the server 160 may make a preliminary binding of the offered service configuration for the client device 150. The offered service configuration may comprise service specific QoS configuration information.

604. According to some embodiments the server 160 may send an offer message to the client device 150. The offer message may comprise the offered bound service specific QoS configuration information.

605. The server 160 receives a request message from the client device 150. The request message comprises a service configuration request.

606. In this step the server 160 makes a final binding of the requested service specific QoS service configuration for a service management client 165 in the client device 150, 607. The server 160 sends an acknowledgement message to the client device 150. The acknowledgement message comprises the final bound service configuration requested by the client device 150. The requested service configuration comprises information regarding service specific QoS configuration.

Figure 7:
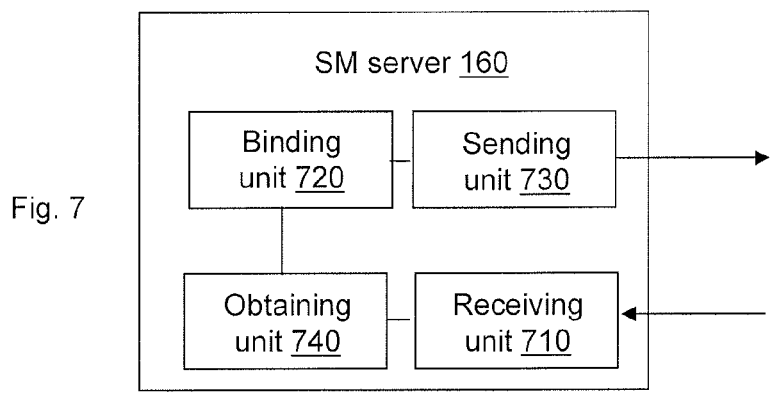

To perform the method steps 601-607 in the service management server 160 for establishing a service specific QoS configuration, according to a first alternative of some of the embodiments, the server 160 is arranged as depicted in FIG. 7. The service management server 160 is arranged to be comprised in a data network 100). The server 160 is adapted to be connected to a client device 150. The server (160) comprises:

a receiving unit 710 being adapted to receive a request message from the client device 150. The request message comprises a service configuration request. According to some embodiments may the receiving unit 710 further be adapted to receive an offer request message from the client device 150. The offer request message may comprise a service configuration offer request.

a reservation unit 720 being adapted to make a final binding of the requested service specific QoS service configuration for a service management client 165 in the client device 150. According to some embodiments may the reservation unit 720 further be adapted to make a preliminary binding of the offered service configuration for the client device 150. The offered service configuration may comprise service specific QoS configuration information a sending unit 730 being adapted to send an acknowledgement message to the client device 150. The acknowledgement message comprises an acknowledgement of the final bound service specific QoS configuration information. According to some embodiments may the sending unit 730 further be adapted to send an offer message to the client device 150. The offer message may comprise the offered bound service specific QoS configuration information.

According to some embodiments may the server 160 further comprise an obtaining unit 740 adapted to obtain an offer for a service configuration for the requested service configuration.

According to some embodiments the DHCP server may comprise an internal pool of IP addresses and information.

FIG. 8 presents the method steps, performed by an intermediate node 110, 120, 130, for establishing a service specific QoS configuration, according to a first alternative of some of the embodiments. The intermediate node 110, 120, 130 is comprised in a data network 100. The node 110, 120, 130 is adapted to be connected to a server 160 comprised in the data network 100 and to a client device 150. According to some embodiments any of the method steps 801-803 may be performed by Dynamic Host Control Protocol (DHCP) signalling.

The method comprises the following steps:

801. The intermediate node 110, 120, 130 receives an acknowledgement message addressed to the client device 150 from the server 160. The acknowledgement message comprises a service configuration requested by the client device 150. The requested service configuration comprises information regarding service specific QoS configuration.

802. In this step the intermediate node 110, 120, 130 configures the service according to the acknowledged service specific QoS configuration information.

803. The intermediate node 110, 120, 130 sends the received acknowledgement message to the client device 150. The acknowledgement message comprises the requested service configuration. The requested service configuration comprises information regarding QoS configuration. The configuration is service specific.

To perform the method steps 801-803 in the intermediate node 110, 120, 130 for establishing a service specific QoS configuration, according to a first alternative of some of the embodiments, the intermediate node 110, 120, 130 is arranged as depicted in FIG. 9. The intermediate node 110, 120, 130 is comprised in a data network 100. The node 110, 120, 130 is adapted to be connected to a service management server 160 comprised in the data network 100 and to a client device 150. The client device 150 is adapted to be connected to the data network 100. The intermediate node 110, 120, 130 comprises:

a receiving unit 910 adapted to receive an acknowledgement message addressed to the client device 150 from the server 160. The acknowledgement message comprises a service configuration requested by the client device 150. The requested service configuration comprises service specific QoS configuration information.

a configuring unit 930 adapted to configure the service according to the acknowledged service specific QoS configuration information.

a sending unit 920 adapted to send the received acknowledgement message to the client device 150. The acknowledgement message comprises a requested service configuration. The requested service configuration comprises service specific QoS configuration information.

According to some embodiments the intermediary node 110, 120, 130 may further comprise a service management agent 167. The service management agent (167) may further perform the method steps of 801-803.

According to some embodiments the intermediate node 110, 120, 130 may further be represented by an access node 110 and/or a switch 120 and/or an edge router 130.

The information regarding QoS configuration comprised in the service management messages as described above may be implemented in a number of ways. According to some embodiments the information regarding QoS configuration may be presented as a set of at least one QoS value.

According to some embodiment may each of the QoS values correspond to a respective category of the Class of Service (CoS) information, e.g. according to the protocol Differentiated Services (DiffServ). Examples of CoS information are Best Effort (BE), Expedited Forwarding (EF), Assured Forwarding (AF). The CoS information may further be divided into a maximum of 64 different classes.

According to some embodiment the QoS values may each correspond to the categories of the Type Of Service (ToS) byte in the IP version 4.

According to some embodiment the QoS values may each correspond to the categories of Ethernet Priority (P-bit) of the Ethernet header of the Ethernet protocol.

To comprise the QoS configuration information in the service management messages may be implemented in several different ways. According to some embodiments the service management messages comprise service configuration information such as IP address allocated to the client device 150 and default edge router and/or default edge routers. The QoS information may be given respectively for each listed edge router. The QoS information may be given respectively for each listed address interval of the edge router/routers 130 thus enabling service specific QoS configuration since each listed address interval of the edge router/routers 130 may corresponds to a different service and/or service provider. FIG. 10 presents an example of the service specific QoS configuration information as presented above. In FIG. 10 the service configuration information may comprise each listed service and it corresponding edge router address interval is followed by the QoS configuration information for the service. This is however only one exemplary embodiment among many. The service specific QoS configuration information may be presented in the shape of first listing the QoS configuration information and then listing the service and its corresponding edge router address interval. According to some embodiments the destination addresses of the edge routers may be Internet Protocol (IP) addresses or Transport Control Protocol/User Datagram Protocol (TCP/UDP) destination ports or combinations of IP addresses and TCP/UDP ports.

According to some embodiments wherein the service management messages are DHCP messages the QoS configuration information may be comprised in the service management messages implemented using DHCP options as described below:

According to some embodiments the DHCP option 121, Classless Static Route, may be extended with QoS information to form a new option for Classless Static Route with QoS information. As described above, FIG. 10 present an example of how the QoS configuration information may be comprised in the service management message which is applicable to the DHCP option 121. The benefit of extending DHCP option 121 is that the destination IP network information is supplied only one time together with the QoS information. This avoids redundant information when signaling.

According to some embodiments DHCP may be extended with a new option for destination specific QoS. The new option may be a separate QoS option comprising information of service destinations such as edge router address intervals, and their corresponding respective QoS configuration information. However using QoS configuration information supplied as a new separate QoS option, DHCP requires that the service configuration information, such as IP address allocated to the client device 150, is included as well when initialing a service configuration according to DHCP. This results in that the destination information will be listed twice. Once in the ordinary destination options, such as option 121, and once in the accompanying separate new QoS option. The benefit of a separate QoS option is that it is easy to implement in intermediate nodes like access nodes 110 and edger routers 130 before standardization without any impact on end-user devices.

The present methods and network nodes for network QoS can be implemented through one or more processors together with computer program code for performing the functions of the invention. The program code mentioned above may also be provided as a computer program product, for instance in the form of a data carrier carrying computer program code for performing the present method when being loaded into any of the access node 110, switch 120, edge router 130, client device 150, client interface 152, server 160, second server 162, client 165 and/or agent 167. One such carrier may be in the form of a CD ROM disc. It is however feasible with other data carriers such as a memory stick. The computer program code can furthermore be provided as pure program code on a server and downloaded to any of the nodes as listed above remotely.

When using the word "comprise" or "comprising" it shall be interpreted as non-limiting, in the meaning of "consist at least of".

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in an intermediate node in a data network for establishing a service specific configuration of end-to-end Quality of Service (QoS), the node being configured to be connected to a service management server in the data network and to a client device that supports a plurality of different services, the method comprising:
   receiving a message from the service management server, the message including service configuration information for a given one of the plurality of services supported by the client device and information regarding a service specific end-to-end Quality of Service (QoS) configuration for the given service, wherein the service configuration information in the message includes a destination address associated with the service configuration, and wherein the end-to-end QoS configuration information in the service configuration information includes a QoS value for the given service associated with the destination address and with the intermediate node;
   configuring the given service according to the service specific QoS value in the message received from the service management server; and
   sending the received message to the client device, thereby enabling the client device to configure the given service therein according to the service specific QoS value so as to enable the given service to have the service specific end-to-end QoS configuration starting from the client device, continuing at the intermediate node, and ending at the destination address.

2. The method according to claim 1, wherein at least one of the following is performed by Dynamic Host Control Protocol (DHCP) signaling:
   receiving the message;
   configuring the given service; and
   sending the received message.

3. An intermediate node in a data network, the node being configured to be connected to a service management server in the data network and to a client device that supports a plurality of different services, the intermediate node comprising:
   a receiving unit configured to receive a message from the service management server, the message including service configuration information for a given one of the plurality of services supported by the client device and information regarding a service specific end-to-end Quality of Service (QoS) configuration for the given service, wherein the service configuration information in the message includes a destination address associated with the service configuration, and wherein the end-to-end QoS configuration information in the service configuration information includes a QoS value for the given service associated with the destination address and with the intermediate node;

a configuring unit configured to configure the given service according to the service specific QoS value in the message received from the service management server; and a sending unit configured to send the received message to the client device, thereby enabling the client device to configure the given service therein according to the service specific QoS value so as to enable the given service to have the service specific end-to-end QoS configuration starting from the client device, continuing at the intermediate node, and ending at the destination address.

4. The intermediate node according to claim 3, further comprising a service management agent.

5. The intermediate node according to claim 3, wherein the intermediate node comprises one of an access node, a switch, and an edge router.

6. A method in an intermediate node in a data network for establishing a service specific configuration of end-to-end Quality of Service (QoS), the node being configured to be connected to a service management server in the data network and to a client device that supports a plurality of different services, the method comprising:

receiving a message from the service management server, the message including service configuration information for a given one of the plurality of services supported by the client device and information regarding a service specific end-to-end Quality of Service (QoS) configuration for the given service, wherein the service configuration information in the message includes a destination address associated with the service configuration, and wherein the end-to-end QoS configuration information in the service configuration information includes a QoS value for the given service associated with the destination address and with the intermediate node;

configuring the given service according to the service specific QoS value in the message received from the service management server;

receiving from the client device, data traffic associated with the given service;

determining whether the received data traffic has a QoS configuration other than the service specific end-to-end QoS configuration for the given service; and when the received data traffic has a QoS configuration other than the service specific end-to-end QoS configuration for the given service, adjusting the QoS configuration for the received data traffic to the service specific end-to-end QoS configuration.

7. The method according to claim 6, wherein the determining and adjusting are performed by a Dynamic Host Control Protocol (DHCP) agent in the intermediate node.

8. An intermediate node in a data network, the node being configured to be connected to a service management server in the data network and to a client device that supports a plurality of different services, the intermediate node comprising:

a receiving unit configured to receive a message from the service management server, the message including service configuration information for a given one of the plurality of services supported by the client device and information regarding a service specific end-to-end Quality of Service (QoS) configuration for the given service, wherein the service configuration information in the message includes a destination address associated with the service configuration, and wherein the end-to-end QoS configuration information in the service configuration information includes a QoS value for the given service associated with the destination address and with the intermediate node;

a configuring unit adapted to configure the given service according to the service specific QoS value in the message received from the service management server; and an agent configured to receive from the client device, data traffic associated with the given service, and to determine whether the received data traffic has a QoS configuration other than the service specific end-to-end QoS configuration for the given service, wherein when the received data traffic has a QoS configuration other than the service specific end-to-end QoS configuration for the given service, the agent is configured to adjust the QoS configuration for the received data traffic to the service specific end-to-end QoS configuration.

9. The intermediate node according to claim 8, wherein the agent is a Dynamic Host Control Protocol (DHCP) agent.

10. The intermediate node according to claim 9, wherein the DHCP agent is one of a DHCP relay agent, a DHCP forwarding agent, and a DHCP intermediate agent.

* * * * *

UNITED STATES PATENT AND TRADEMARK OFFICE
CERTIFICATE OF CORRECTION

| | | |
|---|---|---|
| PATENT NO. | : 9,054,966 B2 | Page 1 of 2 |
| APPLICATION NO. | : 14/090044 | |
| DATED | : June 9, 2015 | |
| INVENTOR(S) | : Thyni | |

It is certified that error appears in the above-identified patent and that said Letters Patent is hereby corrected as shown below:

On the Title Page, in the Figure, for Tag "405", in Line 1, delete "requesred" and insert -- requested --, therefor.

IN THE DRAWINGS

In Fig. 4, Sheet 4 of 6, for Tag "405", in Line 1, delete "requesred" and insert -- requested --, therefor.

IN THE SPECIFICATION

In Column 1, Line 6, delete "co-pending".

In Column 1, Line 7, delete "2010," and insert -- 2010, now Pat. No. 8,650,294, --, therefor.

In Column 1, Line 61, delete "consol," and insert -- console, --, therefor.

In Column 8, Line 7, delete "sever 160" and insert -- server 160 --, therefor.

In Column 9, Line 39, delete "sever 160." and insert -- server 160. --, therefor.

In Column 11, Line 24, delete "306. *The" and insert -- 306. The --, therefor.

In Column 11, Line 32, delete "client 150" and insert -- client device 150 --, therefor.

In Column 11, Line 33, delete "client 150" and insert -- client device 150 --, therefor.

In Column 12, Line 23, delete "sever 160" and insert -- server 160 --, therefor.

In Column 14, Lines 24-25, delete "information," and insert -- information. --, therefor.

Signed and Sealed this
Sixteenth Day of February, 2016

Michelle K. Lee
*Director of the United States Patent and Trademark Office*

IN THE SPECIFICATION

In Column 14, Line 27, delete "selecting 530 unit" and insert -- selecting unit 530 --, therefor.

In Column 14, Line 39, delete "comprise" and insert -- comprise: --, therefor.

In Column 15, Line 24, delete "device 150," and insert -- device 150. --, therefor.

In Column 15, Line 53, delete "information" and insert -- information. --, therefor.